July 17, 1934.    T. M. KEEFE    1,966,505
MIRROR OR LIKE FRAMED ARTICLE
Filed May 19, 1931
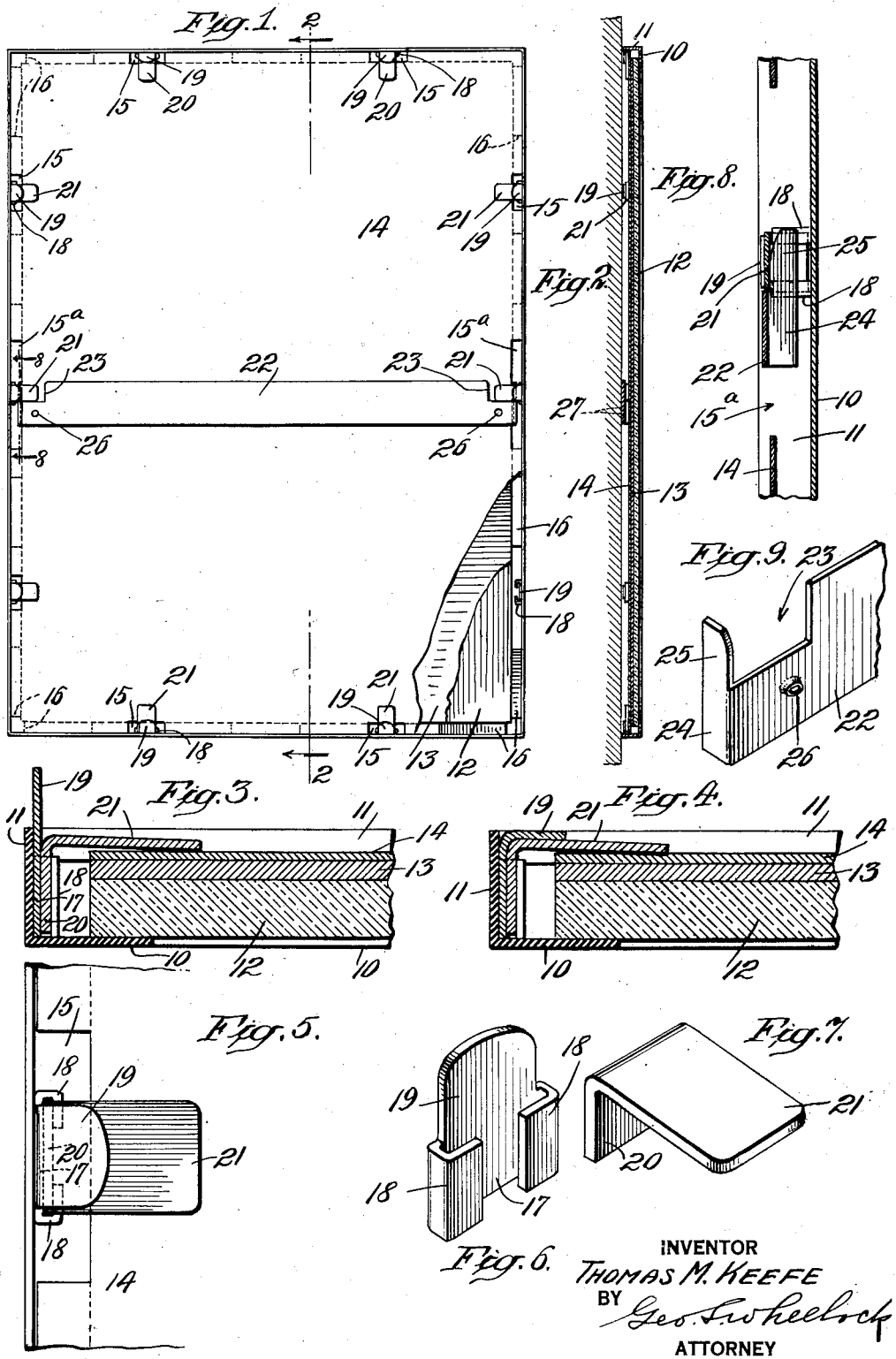
INVENTOR
THOMAS M. KEEFE
BY
Geo. F. Wheelock
ATTORNEY Patented July 17, 1934

1,966,505

UNITED STATES PATENT OFFICE 1,966,505

MIRROR OR LIKE FRAMED ARTICLE

Thomas M. Keefe, Boston, Mass., assignor to J. P. Eustis Manufacturing Company, Cambridge, Mass., a corporation of Massachusetts Application May 19, 1931, Serial No. 538,458

9 Claims. (Cl. 45—18)

The present invention embodies certain important improvements over the construction disclosed in Reissue Patent 13,140, dated Aug. 2, 1910, which relates to means for mounting mirrors, pictures, etc. in metallic frames. In that patent clamping means are disclosed which are held to the frame by means of visible screws, such clamping means securing the mirror or other article to the frame.

While the present invention does not necessarily preclude securing means which are visible, nevertheless it is preferred that nothing but the framed article be visible, inasmuch as the profession and the trade at large are presenting objections to visible fastenings for such a framed article, especially when it takes the form of a mirror having a metal frame, as it is preferred that the same lie flat against the wall so as to produce a neat and chaste effect in bath rooms and elsewhere.

Therefore, an outstanding object of the present invention is preferably to provide a mirror which, while it may be set flat against a wall, is secured in position by fastening means which are concealed or invisible while the mirror is so set.

Another object of the present invention is to provide a mirror or like framed article which may be manufactured in all shapes and sizes and wherein visible screws or similar fastenings are entirely unnecessary, and wherewith it is only desirable to use suitable substitutes for such screws, the same being in effect integral portions of the metal frame of the mirror when such metal frame is used.

Another object of the invention is to provide clamps at the back of the mirror or other article which are held down by means of locking devices, in substitution for screws, which do not pass through the marginal or edge flange of the frame, thereby avoiding the necessity of perforating such flange, so that a smooth and continuous outer surface may be formed on such flange, and thus when the frame is made of angle metal, both flanges will be equally attractive and sightly.

Other objects of the invention are to provide a mirror or framed article, having parts which may be readily assembled and which when assembled will be held rigidly and securely together, and which construction necessitates fewer separate loose parts than heretofore.

These being among the objects of the present invention, the same consists of certain features of construction and combinations of parts to be hereinafter described and then claimed with reference to the accompanying drawing illustrating a preferred embodiment of the invention, and wherein Figure 1 is a rear elevation of a mirror and a supporting bar according to the present invention, parts being broken away;

Fig. 2 is a longitudinal section on the line 2—2 of Fig. 1;

Fig. 3 is an enlarged detail sectional view of a portion of the mirror disclosing a preliminary set-up of the securing members;

Fig. 4 is a similar section showing the tongue or lug of the locking means bent down in active position;

Fig. 5 is a plan of the parts shown in Fig. 4;

Fig. 6 is a detail perspective view of one of the attaching or locking members;

Fig. 7 is a perspective view of one of the clamping members;

Fig. 8 is a sectional detail view on line 8—8, Fig. 1, illustrating how the supporting bar is engaged with the mirror; and Fig. 9 is an enlarged perspective view of one end of the supporting bar.

Figs. 1 and 2 of the drawing illustrate a mirror or framed article which is of oblong rectangular shape, but of course other shapes and proportions may be employed. When an angle metal frame is used it provides a flat face flange 10 and a flat edge flange 11, which are at right angles to each other. A flat article 12 such as a mirror plate of glass and which is silvered at the back in any approved way is mounted in the frame 10, 11.

An intervening cushioning layer 13 consisting preferably of a sheet of soft pasteboard is usually placed under the metal back plate 14 and against the back of the mirror plate. Notches 15 are provided in the edges of the back plate; and in the opposite edges of the back plate, at points coincident with the middle line of the back plate, there are preferably longer notches 15a. All of these notches 15, 15a enable the assembly of the means which are employed for securing the back plate and cushioning sheet in the frame and over the mirror. At intervals around the frame are located cushioning blocks 16 of wood or the like, which are arranged between the edge flange 11 and the edge of the mirror plate 12. The above described parts are structurally disclosed in the said reissue patent, with little variations.

Under the present invention special locking or attachment means are employed which are mounted preferably on the edge flange 11 of the frame. Such means are more clearly disclosed in Figs. 3, 4, 5 and 6. They include a number of similar flat pieces 17 of malleable sheet metal having integral guides 18 at the sides. These guides are provided by bending side portions of the sheet metal inwardly towards each other into substantially L-shape, having the longer legs of the same spaced away from the main piece 17, so that a socket is provided between the latter and the inturned guides 18. Each of the flat pieces 17 is extended longitudinally beyond the guides 18 so as to provide a tongue or lug 19 of suitable length, so that it may be bent over toward the guides 18.

A plurality of the sockets thus provided is mounted upon the inner surface of the edge flange 11, as more clearly illustrated in Fig. 1. It is not necessary to perforate the flange 11 in any manner, inasmuch as a plurality of such sockets, each like the other and formed from malleable metal into a main piece 17, guides 18 and lug 19, are preferably spot-welded, brazed or soldered to the flange 11, at points between the flange and the main pieces 17 of the sockets. When the sockets are thus rigidly mounted upon the inner surface of the flange 11 they will extend transversely of such flange and at right angles to the face flange 10, being rigidly fixed as it were in the angle between the two flanges of the frame. In this way the sockets practically become integral portions of the edge flange 11, their lengths being approximately equivalent to the combined thicknesses of the plate 12, sheet of pasteboard 13 and the metal back plate 14.

When the sockets have been properly mounted upon the angle metal frame, the tongues or lugs 19 will project at intervals apart rearwardly from the edge flange 11, as shown in Fig. 3. When these parts have been assembled, the article to be framed may be set therein for securement. In the illustrated instance the glass mirror 12 is first set against the inner surface of the face flange 10, then the cushioning layer or pasteboard 13 is applied and finally the back plate 14. The next step is to make use of clamping members preferably of angle metal, which provide each with a leg 20 and a leg 21 extending at a suitable angle thereto. A plurality of these clamping members is provided corresponding in number with that of the sockets. The legs 20 of the clamping members are now introduced into the sockets until the legs 21 are brought to bear against the back plate 14, such legs 21 extending inwardly away from the edge flange 11. Preferably the legs 20 and 21 are bent at somewhat less than a right angle, as in said reissue patent, so that the tips of the legs 21 will first come in contact with the back plate 14, as in Fig. 3 herein. The clamping members 20, 21 having been applied in position, the final step of assembly of the parts resides in bending over the tongues or lugs 19 until they firmly bear upon the clamping members, as shown in Fig. 4. As the lugs 19 are formed from malleable metal and of reasonable thickness, it will be seen that when they are being gradually turned down, they will act as pressure members to cause the pressure of the clamping members to increase and to ultimately firmly bind the parts which are between the legs 21 and the face plate 10, as in Fig. 4.

The gradual forcing down of the clamps is due to the fact that each bendable tongue or lug 19 has its bending line determined by bearing on the outer corner of each clamp, and when the lug is bent down further it forces the leg 20 of the clamp more fully into the socket and finally bears firmly down onto the leg 21 of the clamp, thereby increasing the bearing area of the leg 21 on the back plate 14. Such action and result are somewhat facilitated by extending the legs of each clamp at less than a right angle, the one to the other, as the leg 21 will suitably give or yield to the pressure of the lug 19. Also the bent over portion of the lug is preferably rather shorter than leg 21 for obtaining more satisfactory results. As a result of the combined functions of the separate clamp and the bendable lug, the clamp is reinforced for a suitable portion of its length so that when the clamps are properly applied, the parts in the frame are more solidly and firmly held in place than heretofore, and at the same time such retaining means preferably are concealed.

When the parts of the mirror or other framed article are all properly assembled into one substantially rigid article, the securing devices will be concealed entirely behind the edge flange 11, and it is preferred that there be no protrusion thereof beyond the free edge of the flange 11. The mirror plate 12 will thus be firmly bound and locked within the frame and be snug against the face flange 10.

Suitable means are provided for hanging the mirror or other framed article in position on a wall, as shown in Fig. 2. Such means preferably reside in a metallic supporting bar 22 which is of slightly less length than the width of the framed article, as shown in Fig. 1. (See also Figs. 2, 8 and 9.) Each end of the supporting bar 22 is provided with a recess 23 in its upper edge, and beyond the recesses the end portions of the bar are bent in the same direction in parallel planes so as to provide end members 24 and hook portions 25 extending breadthwise of the bar and upwardly therefrom. The ends of these hook portions are slightly tapered, as shown. Screw or nail holes 26 are also provided in the ends of the bar or strip 22.

Before the mirror is applied to a wall, the desired location thereof is selected and the supporting bar 22 placed in proper horizontal position and secured by means of nails or screws 27 which pass through the holes 26. As the body of the bar between the parallel end members is substantially flat, it will be caused to lie flat against the wall, with the parallel end members extending outwardly and the hooks upwardly. Inasmuch as it is preferred that the notches 15a at the mid-length of the mirror be of a length more than twice the width of the supporting bar 22, it will be seen that either end of the mirror may be placed uppermost, because the parallel end portions of the bar may be passed into the notches 15a at either side of the securing devices which are located at said notches. When this has been done, the mirror is allowed to drop a slight distance so as to enable the hook-portions 25 to engage underneath the legs 21 of the clamping members. As these are rigidly held in position, they will constitute firm abutments resting upon the longitudinal edges of the bar 22 which are at the bottom of the end recesses 23 thereof, so that the mirror or other framed article is firmly supported and set flush against the wall.

It is obvious from the illustrations and description that the invention is susceptible to more or less modification without departing from it as expressed in the appended claims.

What I claim as new is,—

1. In a mirror or the like framed article, the combination of a metal frame having an edge flange, a plurality of metal lugs rigid with the flange and located at its inner surface, a plurality of corresponding sockets under the lugs, and angular clamping members inserted in the sockets and engaged by the lugs for retaining the article in position.

2. In a mirror or the like framed article, the combination of an angle-metal frame providing a face flange and an edge flange, a plurality of sockets on the inner surface of the edge flange, an article such as a glass fitted back of the face flange, a plurality of angular metal clamping members having corresponding legs mounted in the sockets, and the other legs extending inwardly from the rear ends of the sockets and adapted to hold the article in position, and a plurality of bendable metal lugs rigid with and extending inwardly from the edge flange, the lugs bearing on the inward legs of the clamping members to press them forwardly.

3. In a mirror or the like framed article, the combination of an angle-metal frame providing a face flange and an edge flange, a plurality of metal sockets of bendable metal and permanently secured on the inner surface of the edge flange, an article such as a glass fitted back of the face flange, a plurality of angular metal clamping members having corresponding legs mounted in the sockets, and the other legs extending inwardly from the rear ends of the sockets and adapted to hold the article in position, and a plurality of bendable metal lugs integral with and extending inwardly from the sockets, and bearing on the inward legs of the clamping members to press them forwardly.

4. In a mirror or like framed article, the combination with a frame, the article therein, a back plate provided with notches in its edges, and secured to the frame and over the article, abutments at the notches, a supporting bar provided with means enabling it to be mounted on a wall, the bar extending transversely of the back plate and provided with hook shaped portions for entering the notches and supporting the framed article through the medium of such abutments.

5. In a mirror or like framed article, the combination with a frame, the article therein, a back plate provided with openings, means extending through the openings for securing the back plate to the frame and over the article, a supporting bar provided with means enabling it to be mounted on a wall, the bar extending transversely of the back plate and provided with hook shaped portions for entering the openings, engaging the securing means, and supporting the framed article.

6. A supporting bar for an article, having at its opposite ends parallel members provided with hook portions extending in the planes of such members, such members and hook portions extending breadthwise of and substantially at right angles to the bar.

7. A frame for a mirror or the like, the frame being of angle metal to provide an inward face flange and a surrounding rearward flange, and including pre-formed metal sockets integral with the frame, the sockets extending rearwardly at an angle to the face flange and transversely of and upon the inner face of the surrounding flange, and the surrounding flange concealing the sockets, and bendable lugs at the open ends of the sockets, such sockets adapted to receive clamping members for securing a mirror or the like in the frame, and the bendable lugs to confine the clamping members in the sockets.

8. In a mirror or like framed article, the combination of a frame of angle metal providing an inward face flange and a surrounding edge flange, the frame being provided with a plurality of bendable metal lugs, arranged adjacent to and extending inwardly from the edge flange, and spaced apart clamping members separately mounted upon the edge flange and corresponding in number with the lugs, towards and against which members the lugs are bent for the mutual cooperation of the lugs and clamping members in retaining the contents of the frame.

9. In a mirror or like framed article, the combination of a metallic frame having a face flange and an imperforate rearward edge flange, a plurality of clamping members mounted in fixed position in the space between the two flanges and adapted for positively holding the article to the face flange, and lugs of bendable metal integral with the edge flange and constituting pressure members for separately positively bearing upon the separate clamping members and retaining them in their holding position.

THOMAS M. KEEFE.